US010041830B2

(12) United States Patent
Kimura et al.

(10) Patent No.: US 10,041,830 B2
(45) Date of Patent: Aug. 7, 2018

(54) RADIATION DETECTION APPARATUS

(71) Applicant: Kabushiki Kaisha Toshiba, Minato-ku (JP)

(72) Inventors: Shunsuke Kimura, Kawasaki (JP); Go Kawata, Ohtawara (JP); Hideyuki Funaki, Shinagawa (JP); Masanori Furuta, Odawara (JP); Hirokatsu Shirahama, Yokohama (JP); Tetsuro Itakura, Nerima (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 56 days.

(21) Appl. No.: 15/266,719

(22) Filed: Sep. 15, 2016

(65) Prior Publication Data

US 2017/0248464 A1 Aug. 31, 2017

(30) Foreign Application Priority Data

Feb. 26, 2016 (JP) ................. 2016-036156

(51) Int. Cl.
*G01J 1/44* (2006.01)
(52) U.S. Cl.
CPC ........... *G01J 1/44* (2013.01); *G01J 2001/444* (2013.01)
(58) Field of Classification Search
CPC .......... G01J 2001/444; G01J 1/44; G01J 1/42; G01J 2001/442; G01T 1/17; G01T 1/171; G01T 1/24; G01T 1/247; G01T 1/164; G01T 1/1647; G01T 1/2928; G01T 1/2992; G01T 7/005
See application file for complete search history.

(56) References Cited

U.S. PATENT DOCUMENTS

| 4,296,320 | A | * | 10/1981 | Miller | .............. | G01T 1/40 |
| | | | | | | 250/252.1 |
| 5,200,625 | A | * | 4/1993 | Kawai | .............. | G01T 1/36 |
| | | | | | | 250/374 |
| 5,268,761 | A | * | 12/1993 | White | .............. | H04L 5/06 |
| | | | | | | 348/678 |
| 5,475,727 | A | * | 12/1995 | Buchanan | .............. | G01T 1/40 |
| | | | | | | 378/53 |
| 6,470,285 | B1 | * | 10/2002 | Atwell | .............. | G01T 1/171 |
| | | | | | | 702/189 |
| 7,157,681 | B1 | * | 1/2007 | Tetzlaff | .............. | H01J 43/04 |
| | | | | | | 250/205 |
| 7,982,541 | B2 | * | 7/2011 | Nakai | .............. | H03G 3/3026 |
| | | | | | | 330/129 |
| 8,309,933 | B1 | | 11/2012 | Wang | | |
| 8,890,082 | B2 | | 11/2014 | Scott et al. | | |

(Continued)

FOREIGN PATENT DOCUMENTS

JP   10-186041   7/1998
JP   2003-506945  2/2003

(Continued)

*Primary Examiner* — John Lee
(74) *Attorney, Agent, or Firm* — Oblon, McClelland, Maier & Neustadt, L.L.P.

(57) ABSTRACT

A radiation detection apparatus according to an embodiment includes a radiation detector that detects radiation; a first measurer that measures energy of the radiation from the radiation detected by the radiation detector; and a second measurer that measures the number of times that the radiation detector detects the radiation.

9 Claims, 11 Drawing Sheets

(56) References Cited

U.S. PATENT DOCUMENTS

| | | | | |
|---|---|---|---|---|
| 8,933,412 B2* | 1/2015 | Fechner | | G01T 7/005 |
| | | | | 250/370.14 |
| 8,937,275 B2* | 1/2015 | Kulik | | H03K 21/02 |
| | | | | 250/214 R |
| 8,941,076 B2* | 1/2015 | Abraham | | G01T 1/171 |
| | | | | 250/336.1 |
| 8,954,300 B2* | 2/2015 | Scoullar | | G01V 5/0016 |
| | | | | 703/2 |
| 8,988,267 B1 | 3/2015 | Kimura et al. | | |
| 9,109,953 B2 | 8/2015 | Sasaki et al. | | |
| 9,372,271 B2* | 6/2016 | Adolph | | G01T 1/40 |
| 2010/0259330 A1* | 10/2010 | Nakai | | H03G 3/001 |
| | | | | 330/279 |
| 2011/0031405 A1* | 2/2011 | Kulik | | G01T 1/40 |
| | | | | 250/362 |
| 2011/0035197 A1* | 2/2011 | Scoullar | | G01T 1/171 |
| | | | | 703/2 |
| 2011/0098980 A1* | 4/2011 | Ouvrier-Buffet | | G01T 1/171 |
| | | | | 702/189 |
| 2012/0037810 A1 | 2/2012 | Scott et al. | | |
| 2012/0112088 A1* | 5/2012 | Abraham | | G01T 1/171 |
| | | | | 250/395 |
| 2012/0121050 A1* | 5/2012 | De Geronimo | | G01T 1/171 |
| | | | | 375/354 |
| 2012/0236986 A1* | 9/2012 | Schroter | | G01T 1/171 |
| | | | | 378/19 |
| 2012/0305784 A1 | 12/2012 | Wang | | |
| 2013/0341521 A1* | 12/2013 | Fechner | | G01T 7/005 |
| | | | | 250/370.14 |
| 2014/0084149 A1* | 3/2014 | Stoller | | G01T 1/20 |
| | | | | 250/261 |
| 2014/0105350 A1* | 4/2014 | Kulik | | H03K 21/02 |
| | | | | 377/39 |
| 2014/0145072 A1* | 5/2014 | Adolph | | G01T 1/40 |
| | | | | 250/261 |
| 2014/0231646 A1* | 8/2014 | Makino | | G01T 1/172 |
| | | | | 250/336.1 |
| 2014/0328466 A1 | 11/2014 | Proksa et al. | | |
| 2014/0367576 A1 | 12/2014 | Sasaki et al. | | |
| 2015/0084802 A1 | 3/2015 | Kimura et al. | | |
| 2016/0011323 A1 | 1/2016 | Sasaki et al. | | |
| 2016/0306055 A1* | 10/2016 | Adolph | | G01T 1/40 |
| 2017/0248464 A1* | 8/2017 | Kimura | | G01J 1/44 |

FOREIGN PATENT DOCUMENTS

| | | |
|---|---|---|
| JP | 2012-527608 | 11/2012 |
| JP | 2012-251999 | 12/2012 |
| JP | 2014-241543 | 12/2014 |
| JP | 2015-506463 | 3/2015 |
| JP | 2015-65532 | 4/2015 |
| WO | WO 01/10019 A2 | 2/2001 |

* cited by examiner

RADIATION DETECTION APPARATUS

CROSS REFERENCE TO RELATED APPLICATIONS

This application is based upon and claims the benefit of priority from the prior Japanese Patent Application No. 2016-036156 filed in Japan on Feb. 26, 2016; the entire contents of which are incorporated herein by reference.

FIELD

The present disclosure relates to a radiation detection apparatus.

BACKGROUND

In general, characteristics of a radiation detector, such as gain or quantum efficiency, are varied with a counting rate of radiation incident on the radiation detector. For example, considered is a pulse signal output from the radiation detector. When the counting rate of radiation incident on the radiation detector is varied, a width and a wave height of the pulse signal output from the radiation detector are varied even if radiation having the same level of energy is incident on the radiation detector. In this case, a maximum value of an energy histogram of the measured radiation is also varied, resulting in degradation in energy resolution of a radiation detection apparatus.

Therefore, it is necessary to correct a variation in characteristics of the radiation detector due to the counting rate variation so as to prevent the degradation in energy resolution of a radiation detection apparatus.

DETAILED DESCRIPTION

A radiation detection apparatus according to embodiment includes a radiation detector that outputs a pulse signal in response to radiation incident thereon, a first measurer that measures radiation energy based on the pulse signal, and a second measurer that counts the number of pulses in the pulse signal.

Hereinafter, embodiments of the present disclosure will be described with reference to the drawings. Throughout the description, the same reference numerals are given to the same or similar parts. The drawings are schematic or conceptual, and illustrated ones are not always the same as actual ones.

(First Embodiment)

Figure 1:
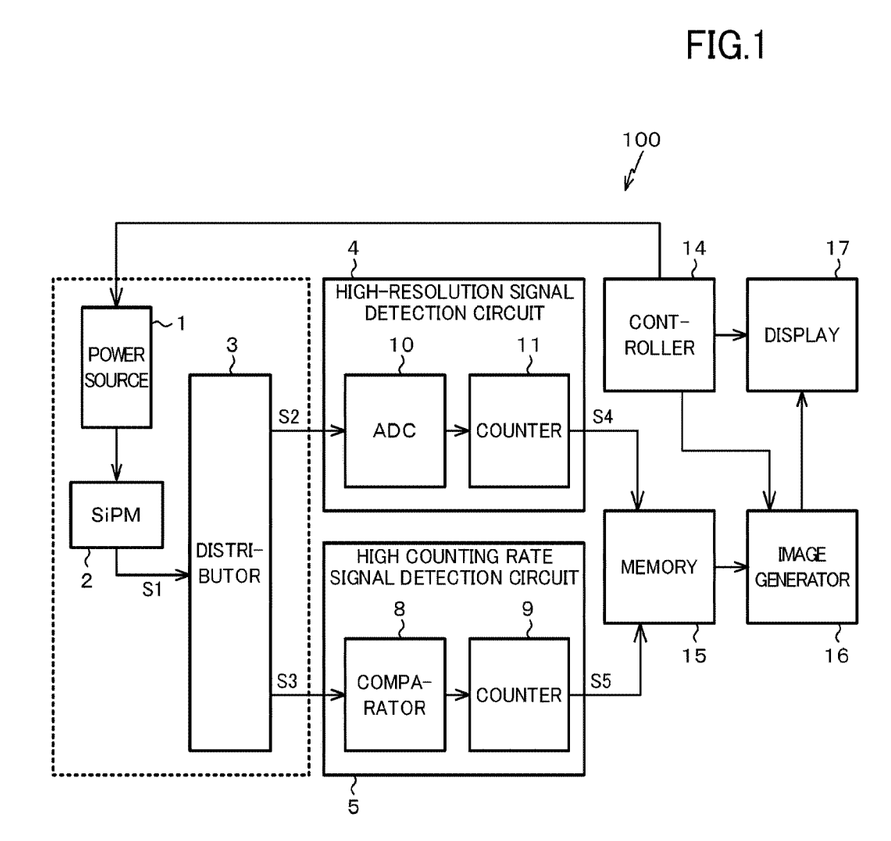
FIG. 1 is a configuration view of a radiation detection apparatus.

FIG. 1 illustrates a configuration of a radiation detection apparatus 100. The radiation detection apparatus 100 includes a power source 1, a radiation detector 2, a distributor 3, a high-resolution signal detection circuit 4, a high counting rate signal detection circuit 5, a controller 14, a memory 15, an image generator 16, and a display 17.

The radiation detector 2 may be an indirect conversion type radiation detector using, e.g., a silicon photo multiplier (SiPM) or a photomultiplier tube (PMT), or a direct conversion type radiation detector using CdTe (cadmium telluride). The radiation detector 2 detects radiation. The radiation detector 2 is connected to the power source 1. The radiation detector 2 outputs, as a first signal S1, information indicating a charge amount proportional to energy of the detected radiation and the number of detections of the radiation.

The distributor 3 is connected to the radiation detector 2. The distributor 3 divides the first signal S1 output from the radiation detector 2 into a second signal S2 and a third signal S3 and outputs them.

The high counting rate signal detection circuit 5 is connected to the distributor 3.

The high counting rate signal detection circuit 5 counts the number of times that radiation is detected from the third signal S3 and outputs information concerning the number of detections of the radiation as a fifth signal S5. The number of detections of radiation refers to radiation counts detected by the radiation detector per unit time.

The high counting rate signal detection circuit 5 includes a comparator (analog-to-digital converter) 8 and a counter 9.

The third signal S3 to be input to the comparator 8 is a pulse signal. The comparator 8 compares a wave height of the third signal S3 with a threshold for quantization. Specifically, a threshold (reference height) with respect to the wave height of the third signal S3 is provided in the comparator 8. For example, in a case where the comparator 8 is a 1-bit comparator, when the wave height of the third signal S3 input to the comparator 8 is larger than the threshold, the comparator 8 converts the third signal S3 into a digital signal representing "1"; on the other hand, when the wave height of the third signal S3 input to the comparator 8 is smaller than the threshold, the comparator 8 converts the third signal S3 into a digital signal representing "0". The comparator 8 is not limited to the 1-bit analog-to-digital comparator, but may be a 2-or-more-bit analog-to-digital converter.

The counter 9 counts the number of the third signals S3 converted into the digital signals by the comparator 8. That is, the counter 9 counts the number of digital signals representing "1" and the number of digital signals representing "0". In the case of the 1-bit comparator, the digital signal represents only "0" or "1", so that the counter 9 can count at high speed the number of the third signals S3. The high counting rate signal detection circuit 5 excels at counting the number of detections of radiation.

The high-resolution signal detection circuit 4 is connected to the distributor 3.

The high-resolution signal detection circuit 4 measures radiation energy within a predetermined time period from the second signal S2 and outputs, as a fourth signal S4, information concerning the radiation energy.

The high-resolution signal detection circuit 4 includes an analog-to-digital converter 10 and a counter 11.

The analog-to-digital converter 10 is connected to the distributor 3. The analog-to-digital converter 10 converts the second signal S2 output from the distributor 3 into a digital signal. In the case where the analog-to-digital converter 10 has 8-bit resolution, the analog-to-digital converter 10 converts the second signal S2 into a digital signal that is 8-bit binary signal of 0 to 255. The digital signal indicates the radiation energy.

The counter 11 is connected to the analog-to-digital converter 10. The counter 11 counts the number of the digital signals output from the analog-to-digital converter 10. For example, the counter 11 counts the number of the digital signals output from an 8-bit analog-to-digital converter for each energy level indicated by 255 bit from 0 bit.

The fourth signal S4 output from the high-resolution signal detection circuit 4 and the fifth signal S5 output from the high counting rate signal detection circuit 5 are stored in the memory 15. The fourth signal S4 indicates radiation energy. The fifth signal S5 indicates the number of times that the radiation detector 2 has detected radiation. Therefore, the memory 15 stores information concerning radiation energy detected by the radiation detector 2 and information concerning the number of times that the radiation detector 2 has detected radiation.

The image generator 16 synthesizes the fourth signal S4 and fifth signal S5 stored in the memory 15. The image generator 16 forms an image based on the information concerning radiation energy detected by the radiation detector 2 and information concerning the number of times that the radiation detector 2 has detected radiation.

The display 17 displays the image formed by the image generator 16.

The analog-to-digital converter 10 of the high-resolution signal detection circuit 4 starts operating when a signal is output from the comparator 8 of the high counting rate signal detection circuit 5.

The controller 14 controls the power source 1, high-resolution signal detection circuit 4 and high counting rate signal detection circuit 5.

The resolution of the analog-to-digital converter 10 constituting the high-resolution signal detection circuit 4 is higher than the resolution of the comparator 8 constituting the high counting rate signal detection circuit 5. For example, the analog-to-digital converter 10 of the high-resolution signal detection circuit 4 has 8-bit resolution, and the comparator 8 of the high counting rate signal detection circuit 5 has 1-bit resolution.

Figure 2:
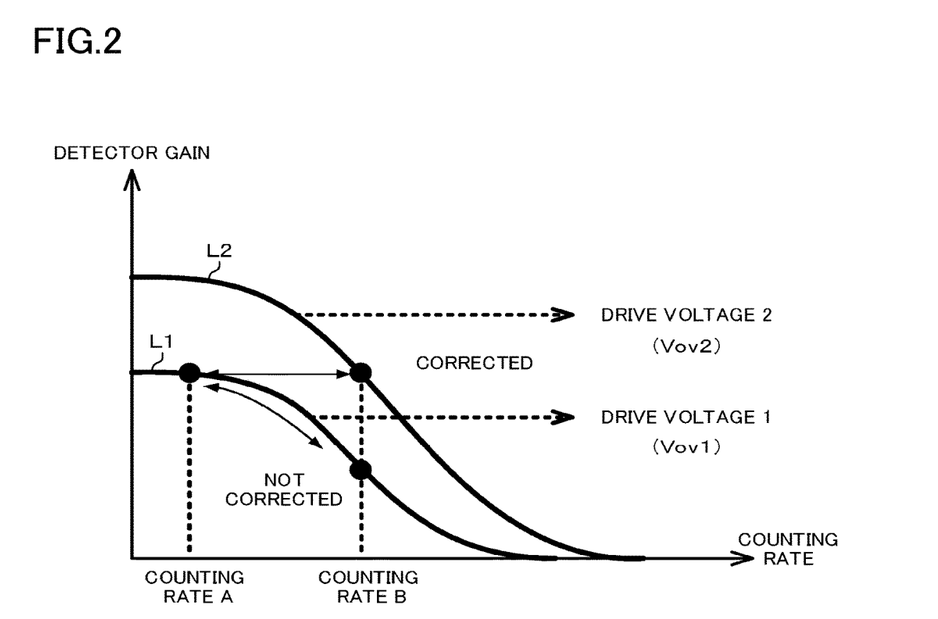
FIG. 2 is a view illustrating a relationship between a counting rate and gain of a radiation detector.

FIG. 2 illustrates a relationship between a counting rate of the radiation detector 2 and a gain of the radiation detector 2. A line L1 indicates a relationship between a counting rate and a gain when a drive voltage 1 is applied to the radiation detector 2. A line L2 indicates a relationship between a counting rate and a gain when a drive voltage 2 is applied to the radiation detector 2.

Description will be given of a case where a voltage to be applied to the radiation detector 2 is the drive voltage 1. When the counting rate of the radiation detector 2 is increased from a counting rate A to a counting rate B, gain of the radiation detector 2 is decreased as indicated by the line L1. At this time, when the application voltage to the radiation detector 2 is increased to the drive voltage 2, the detector gain corresponding to the counting rate A can be maintained, as indicated by the line L2. Thus, even if the counting rate of the radiation detector 2 is increased from the counting rate A to counting rate B, it is possible to prevent a decrease in the detector gain of the radiation detector 2 by changing the voltage to be applied to the radiation detector 2.

For example, the controller 14 holds correction information concerning the line indicating a relationship between the counting rate and gain of the radiation detector 2 by drive voltage to be applied to the radiation detector 2. The controller 14 refers to the correction information and controls the drive voltage to be applied to the radiation detector 2 based on the correction information so that the detector gain of the radiation detector 2 becomes almost constant even if the counting rate is varied.

Figure 3:
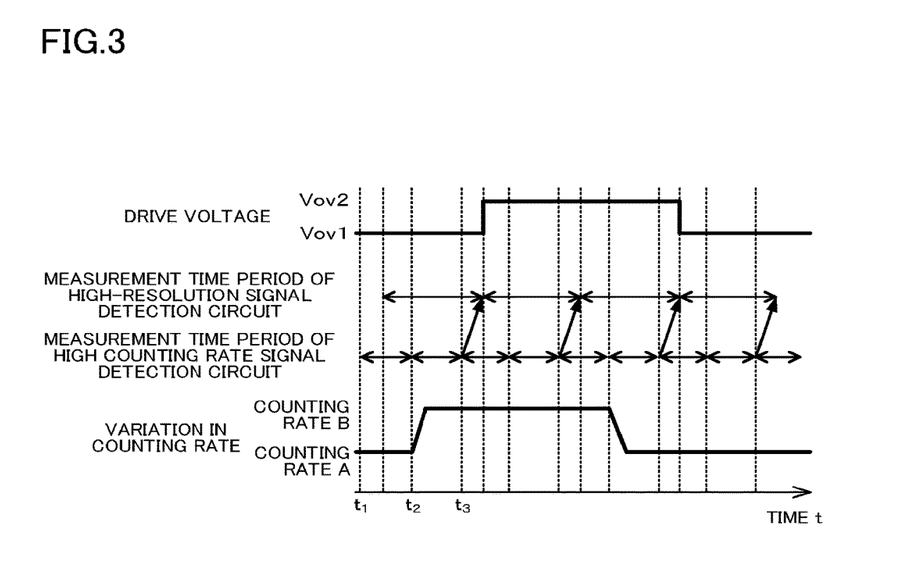
FIG. 3 is a view illustrating a relationship among timings at which a high counting rate signal detection circuit and a high-resolution signal detection circuit perform measurement and time periods during which they perform the measurement.

FIG. 3 illustrates timings at which the high counting rate signal detection circuit 5 and high-resolution signal detection circuit 4 perform measurement and time periods during which they perform the measurement.

The horizontal axis of FIG. 3 represents time, and a drive voltage, a measurement time period of the high-resolution signal detection circuit 4, a measurement time period of the high counting rate signal detection circuit 5 and a variation in the counting rate of the radiation detector 2 appear from the top of FIG. 3.

In a first time period from a first time point $t_1$ to a second time point $t_2$, the counting rate of the radiation detector 2 is the counting rate A. At this time, the high counting rate signal detection circuit 5 counts the number of times (first count) that radiation is detected from the third signal S3. Further, in a second time period from the second time point $t_2$ to a third time point $t_3$, continued from the first time period, the counting rate of the radiation detector 2 is increased from the counting rate A to the counting rate B. At this time, the high counting rate signal detection circuit 5 counts the number of times (second count) that radiation is detected from the third signal S3. The controller 14 estimates the number of radiations to be detected by the radiation detector 2 in the next time period continued from the third time point $t_3$ based on the first and second counts.

The controller 14 controls a voltage to be applied to the radiation detector 2 in accordance with the number of detections of radiation estimated based on the first and second counts. For example, when estimating that the counting rate is increased from the counting rate A to the counting rate B, the controller 14 changes the voltage to be applied to the radiation detector 2 from the drive voltage 1 (Vov1) to the drive voltage 2 (Vov2). At this time, controller 14 controls the drive voltage by changing a potential of the anode or cathode of the SiPM. Alternatively, the controller 14 controls the drive voltage by changing potentials of both the anode and cathode of the SiPM.

A phase when the high counting rate signal detection circuit 5 performs a measurement is assumed to be $\theta_1$ and a period when the high counting rate signal detection circuit 5 performs a measurement is assumed to be $T_1$. A phase when the high-resolution signal detection circuit 4 performs a measurement is assumed to be θ₂ and a period when the high-resolution signal detection circuit 4 performs a measurement is assumed to be 12. A relationship between the period $T_1$ when the high counting rate signal detection circuit 5 performs a measurement and period $T_2$ when the high-resolution signal detection circuit 4 performs a measurement is represented by the following expression (1):

[Formula 1]

$$T_1 \leq T_2 \qquad (1)$$

A relationship between the phase $\theta_1$ when the high counting rate signal detection circuit 5 performs a measurement and the phase $\theta_2$ when the high-resolution signal detection circuit 4 performs a measurement is represented by the following expression (2):

[Formula 2]

$$\theta_1 < \theta_2 \qquad (2)$$

The above-described control by the controller 14, the setting of the phase $\theta_1$ and period $T_1$ when the high counting rate signal detection circuit 5 performs a measurement, and the setting of the phase $\theta_2$ and period $T_2$ when the high-resolution signal detection circuit 4 performs a measurement can also be made through software.

As described above, in the present embodiment, even if the counting rate of the radiation detector 2 is varied, the drive voltage to be applied to the radiation detector 2 can be controlled. Thus, as can be seen from FIG. 2, the gain of the radiation detector 2 is corrected in accordance with the variation in the counting rate. As a result, a variation in the characteristics of the radiation detector 2 due to a variation in radiation dose is corrected with accuracy to prevent degradation in energy resolution. This allows accurate radiation detection.

(Second Embodiment)

Figure 4:
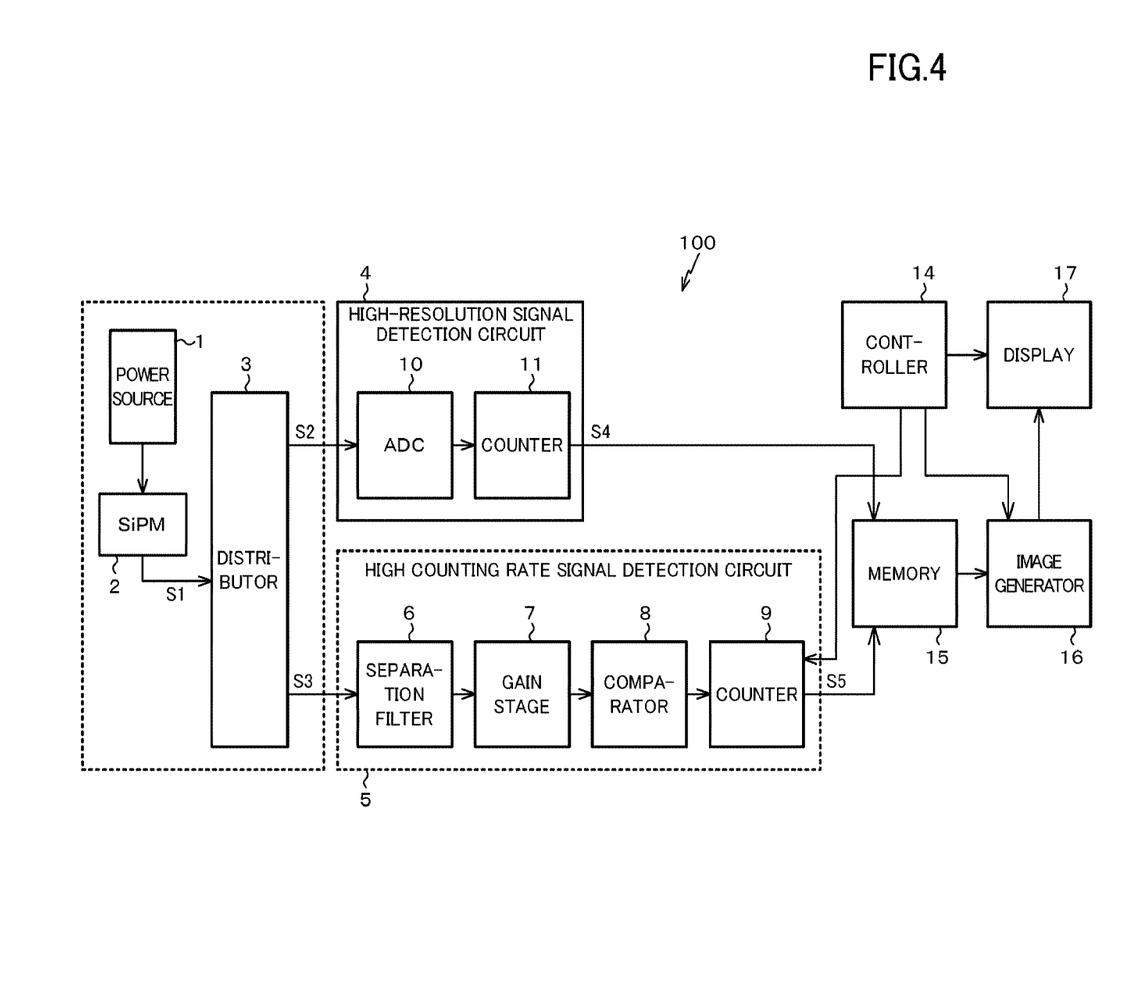
FIG. 4 is a configuration of the radiation detection apparatus.

FIG. 4 illustrates a configuration of the radiation detection apparatus 100 in which a separation filter 6 and a gain stage 7 are added.

The high counting rate signal detection circuit 5 of the radiation detection apparatus 100 further includes a separation filter 6 and a gain stage 7.

The separation filter 6 receives the third signal S3 from the distributor 3. The separation filter 6 performs wave shaping by multiplying a response function of the radiation detector 2 by a transfer function such as an inversion function.

The gain stage 7 is connected to the separation filter 6. By controlling a voltage or a current to be applied to the gain stage 7, the gain stage 7 changes an amplitude of the third signal S3 output from the separation filter 6.

The comparator 8 is connected to the gain stage 7. The comparator 8 compares the wave height of the third signal S3 output from the gain stage 7 with a threshold for quantization.

Figure 5:
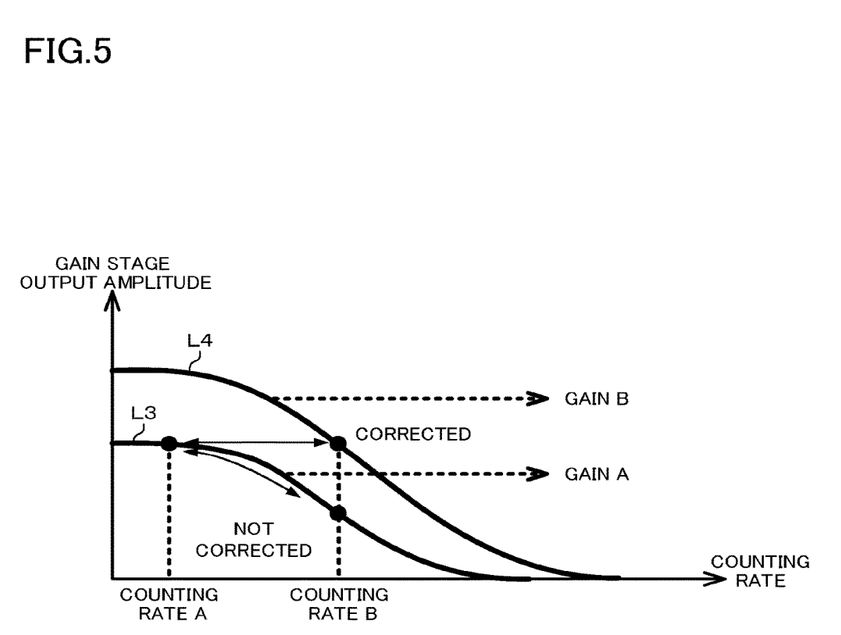
FIG. 5 a view illustrating a relationship between the counting rate and a signal amplitude.

FIG. 5 illustrates a relationship between the counting rate of the radiation detector 2 and a signal output from the gain stage (amplifier) 7. A line L3 indicates a relationship between a counting rate and a gain stage output amplitude of a signal output from the gain stage 7 when the gain of the gain stage 7 is gain A. A line L4 indicates a relationship between a counting rate and a gain stage output amplitude when the gain of the gain stage 7 is gain B.

Description will be given of a case where the gain of the gain stage 7 is the gain A. When the counting rate of the radiation detector 2 is increased from a counting rate A to a counting rate B, the amplitude of a pulse signal output from the gain stage 7 becomes small, as indicated by the line L3. At this time, when the gain of the gain stage 7 is increased to the gain B, the pulse signal amplitude corresponding to the counting rate A can be maintained, as indicated by the line L4. Thus, even if the counting rate of the radiation detector 2 is increased from the counting rate A to the counting rate B, it is possible to prevent a decrease in the amplitude of the pulse signal output from the gain stage 7 by changing the gain of the gain stage 7.

For example, the controller 14 holds correction information concerning the line indicating a relationship between the counting rate and the gain stage output amplitude by gain of the gain stage 7. The controller 14 refers to the correction information and controls the gain of the gain stage 7 based on the correction information so that the gain stage output amplitude becomes almost constant even if the counting rate is varied.

Figure 6:
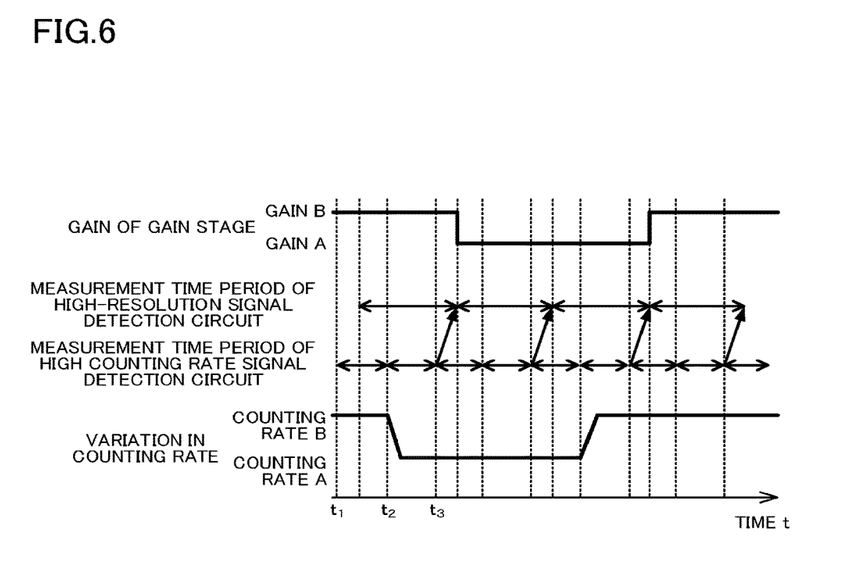
FIG. 6 is a view illustrating a relationship among timings at which the high counting rate signal detection circuit and high-resolution signal detection circuit perform measurement and time periods during which they perform the measurement.

FIG. 6 illustrates timings at which the high counting rate signal detection circuit 5 and high-resolution signal detection circuit 4 perform measurement and time periods during which they perform the measurement.

A horizontal axis of FIG. 6 represents time, and gain of the gain stage 7, a measurement time period of the high-resolution signal detection circuit 4, a measurement time period of the high counting rate signal detection circuit 5, a variation in the counting rate of the radiation detector 2 appear from the top of FIG. 6.

In a first time period from a first time point $t_1$ to a second time point $t_2$, the counting rate of the radiation detector 2 is the counting rate B. At this time, the high counting rate signal detection circuit 5 counts the number of times (first count) that radiation is detected from the third signal S3. Further, in a second time period from the second time point $t_2$ to a third time point $t_3$, continued from the first time period, the counting rate of the radiation detector 2 is decreased from the counting rate B to the counting rate A. At this time, the high counting rate signal detection circuit 5 counts the number of times (second count) that radiation is detected from the third signal S3. The controller 14 estimates the number of radiations to be detected by the radiation detector 2 in the next time period continued from the third time point $t_3$ based on the first and second counts. When estimating that the counting rate is decreased from the counting rate B to the counting rate A, the controller 14 controls the voltage to be applied to the gain stage 7 to change the gain of the gain stage 7 from the gain B to the gain A.

A phase when the high counting rate signal detection circuit 5 performs a measurement is assumed to be $\theta_1$ and a period when the high counting rate signal detection circuit 5 performs a measurement is assumed to be $T_1$. A phase when the high-resolution signal detection circuit 4 performs a measurement is assumed to be $\theta_2$ and a period when the high-resolution signal detection circuit 4 performs a measurement is assumed to be $T_2$. A relationship between the period $T_1$ when the high counting rate signal detection circuit 5 performs a measurement and the period $T_2$ when the high-resolution signal detection circuit 4 performs a measurement is represented by the following expression (3):

[Formula 3]

$$T_1 \leq T_2 \qquad (3)$$

A relationship between the phase $\theta_1$ when the high counting rate signal detection circuit 5 performs a measurement and the phase $\theta_2$ when the high-resolution signal detection circuit 4 performs a measurement is represented by the following expression (4):

[Formula 4]

$$\theta_1 \leq \theta_2 \quad (4)$$

The above-described control by the controller 14, the setting of the phase $\theta_1$ and period $T_1$ when the high counting rate signal detection circuit 5 performs a measurement, and the setting of the phase $\theta_2$ and period $T_2$ when the high-resolution signal detection circuit 4 performs a measurement can also be made through software.

As described above, in the present embodiment, even if the counting rate of the radiation detector 2 is varied to vary the gain of the radiation detector 2, the amplitude of the signal output from the radiation detector 2 is controlled by the gain stage 7. Thus, as can be seen from FIG. 5, the amplitude of the signal from the radiation detector 2 is corrected in accordance with the variation in the counting rate. As a result, a variation in the characteristics of the radiation detector 2 due to a variation in radiation dose is corrected with accuracy to prevent degradation in energy resolution. This allows accurate radiation detection.

(Third Embodiment)

Figure 7:
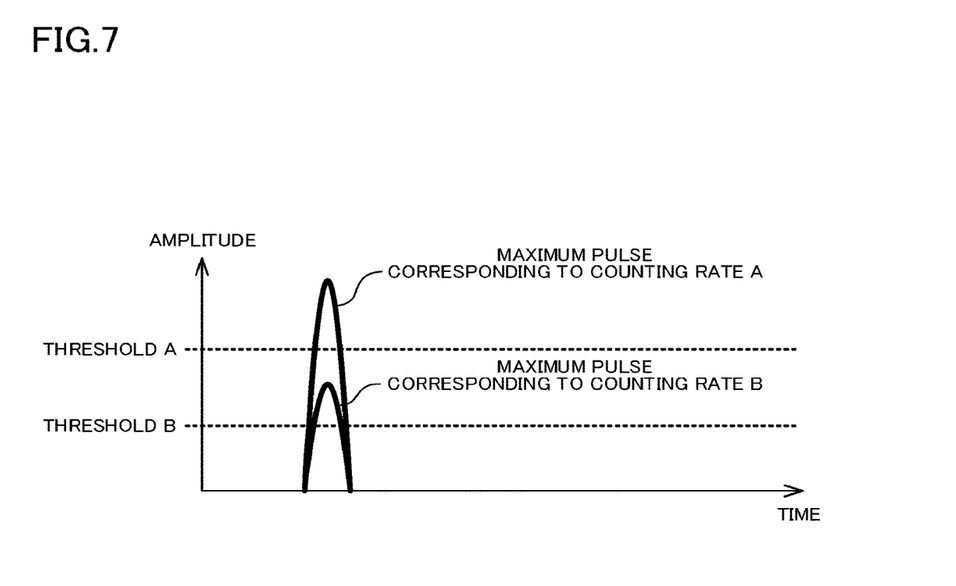
FIG. 7 is a view illustrating a relationship between time and amplitude.

FIG. 7 illustrates a relationship between a pulse signal amplitude in the comparator (analog-to-digital converter) 8 and time.

The comparator 8 has a threshold A with respect to the wave height of the pulse signal which is output from the gain stage 7 when the counting rate of the radiation detector 2 is the counting rate A. For example, the threshold A is set at 80% of the wave height of the pulse signal output when the counting rate A is set. When the counting rate of the radiation detector 2 is increased from the counting rate A to the counting rate B, the wave height of the pulse signal output from the gain stage 7 becomes small. The wave height of the pulse signal when the counting rate B is set may fall below the threshold A. Thus, in the comparator 8, it is necessary to provide a threshold B with respect to the pulse signal wave height when the counting rate B is set by changing a current or a voltage of the comparator 8. For example, the threshold B is set at 80% of the wave height of the pulse signal output when the counting rate B is set.

Figure 8:
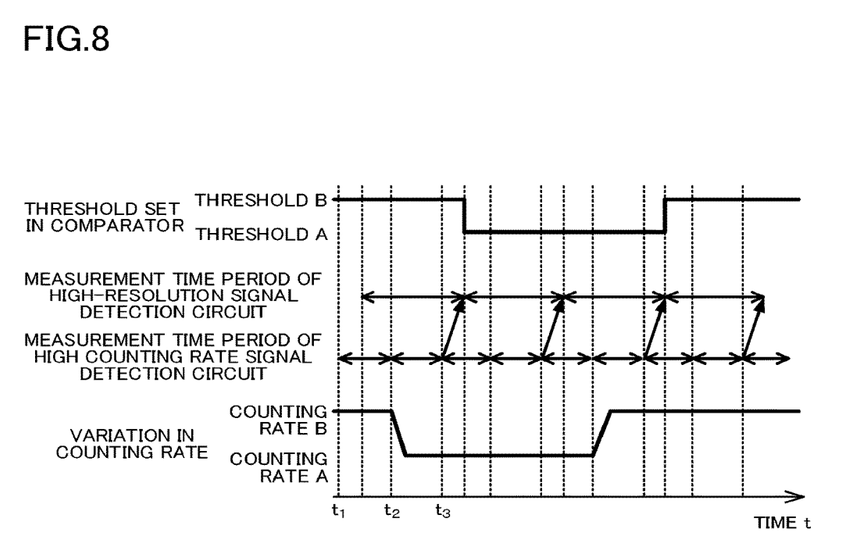
FIG. 8 is a view illustrating a relationship among timings at which the high counting rate signal detection circuit and high-resolution signal detection circuit perform measurement and time periods during which they perform the measurement.

FIG. 8 illustrates timings at which the high counting rate signal detection circuit 5 and high-resolution signal detection circuit 4 perform measurement and time periods during which they perform the measurement.

A horizontal axis of FIG. 8 represents time, and a threshold set in the comparator 8, a measurement time period of the high-resolution signal detection circuit 4, a measurement time period of the high counting rate signal detection circuit 5, a variation in the counting rate of the radiation detector 2 appear from the top of FIG. 8.

In a first time period from a first time point $t_1$ to a second time point $t_2$, the counting rate of the radiation detector 2 is the counting rate B. At this time, the high counting rate signal detection circuit 5 counts the number of times (first count) that radiation is detected from the third signal S3. Further, in a second time period from the second time point $t_2$ to a third time point $t_3$, continued from the first time period, the counting rate of the radiation detector 2 is decreased from the counting rate B to the counting rate A. At this time, the high counting rate signal detection circuit 5 counts the number of times (second count) that radiation is detected from the third signal S3. The controller 14 estimates the number of radiations to be detected by the radiation detector 2 in the next time period continued from the third time point $t_3$ based on the first and second counts.

The controller 14 controls a current or a voltage to be applied to the comparator 8 to change the threshold with respect to the pulse signal. For example, the controller 14 retains a table indicating a relationship between the counting rate and the threshold. The controller 14 refers to the table and selects an appropriate threshold according to the counting rate.

A phase when the high counting rate signal detection circuit 5 performs a measurement is assumed to be $\theta_1$ and a period when the high counting rate signal detection circuit 5 performs a measurement is assumed to be $T_1$. A phase when the high-resolution signal detection circuit 4 performs a measurement is assumed to be $\theta_2$ and a period when the high-resolution signal detection circuit 4 performs a measurement is assumed to be $T_2$. A relationship between the period $T_1$ when the high counting rate signal detection circuit 5 performs measurement and the period $T_2$ when the high-resolution signal detection circuit 4 performs a measurement is represented by the following expression (5):

[Formula 5]

$$T_1 \leq T_2 \quad (5)$$

A relationship between the phase $\theta_1$ when the high counting rate signal detection circuit 5 performs a measurement and the phase $\theta_2$ when the high-resolution signal detection circuit 4 performs a measurement is represented by the following expression (6):

[Formula 6]

$$\theta_1 \leq \theta_2 \quad (6)$$

The above-described control by the controller 14, the setting of the phase $\theta_1$ and period $T_1$ when the high counting rate signal detection circuit 5 performs a measurement, and the setting of the phase $\theta_2$ and period $T_2$ when the high-resolution signal detection circuit 4 performs a measurement can also be made through software.

As described above, in the present embodiment, even if the counting rate of the radiation detector 2 is varied to vary the wave height of the signal from the radiation detector 2, a magnitude of the threshold set in the comparator 8 is controlled. This allows the number of pulses contained in the signal from the radiation detector 2 to be counted accurately. As a result, a variation in the characteristics of the radiation detector 2 due to a variation in radiation dose is corrected with accuracy to prevent degradation in energy resolution. This allows an accurate radiation detection.

(Fourth Embodiment)

Figure 9:
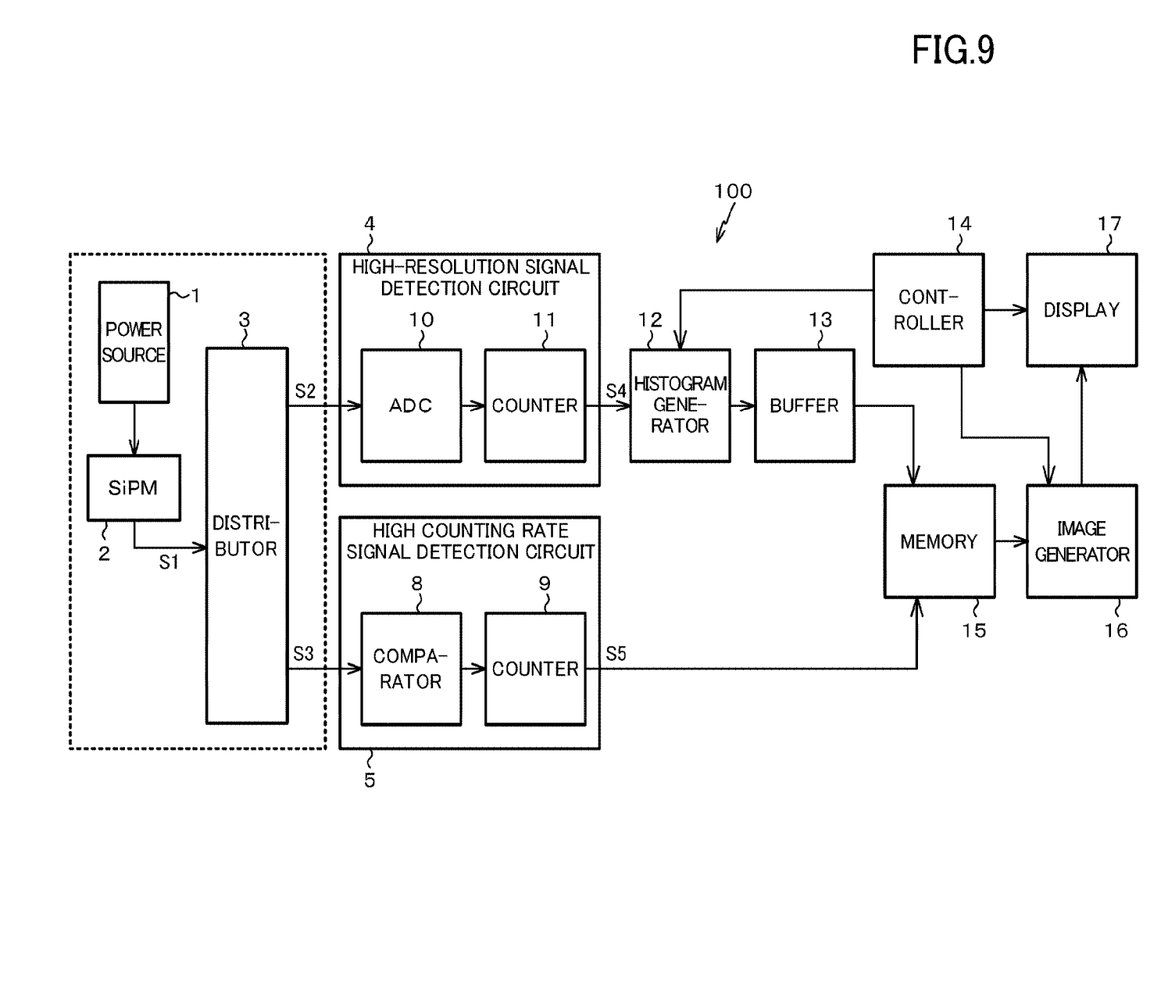
FIG. 9 is a configuration of the radiation detection apparatus.

FIG. 9 illustrates a configuration of the radiation detection apparatus 100 in which a histogram generator 12 and a buffer 13 are added.

The histogram generator 12 is connected to the counter 11 of the high-resolution signal detection circuit 4. The histogram generator 12 is a circuit that generates an energy histogram from an output of the counter 11. For example, when the counter 11 counts a signal to be counted as 255-bit radiation energy as 150-bit radiation energy, the 150-bit is corrected to 255-bit to thereby generate a new histogram.

The buffer 13 is connected to the histogram generator 12. The buffer 13 stores a signal passing through and output from the histogram generator 12.

A fourth signal S4 passing through the high-resolution signal detection circuit 4, histogram generator 12, and buffer 13 is stored in the memory 15.

Figure 10A:
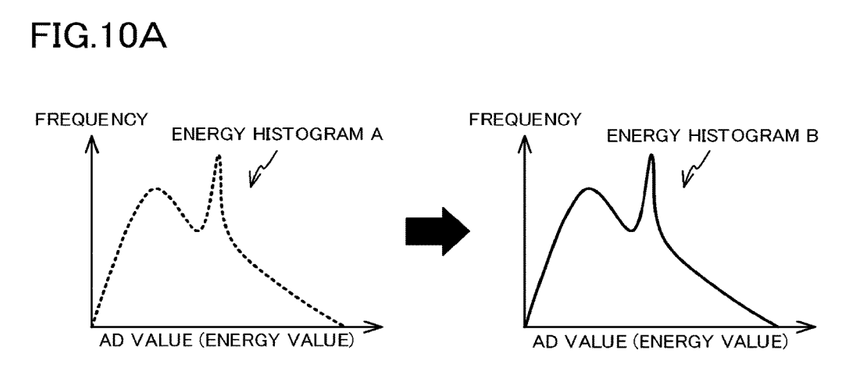
FIG. 10A is a view illustrating an energy histogram.
Figure 10B:
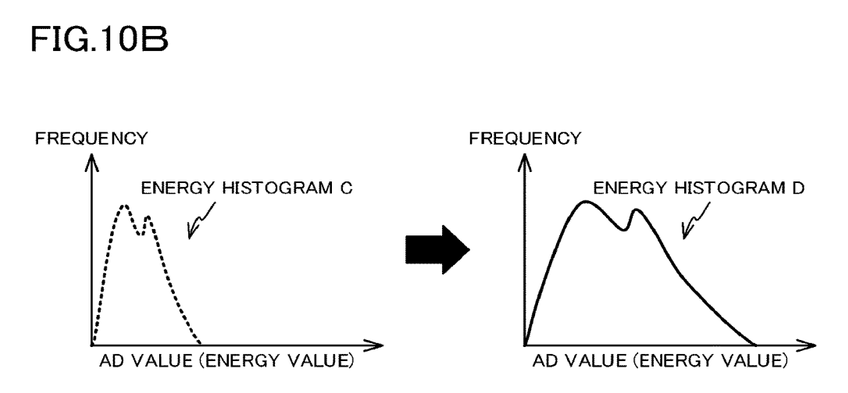
FIG. 10B is a view illustrating an energy histogram.

FIG. 10A illustrates an energy histogram when no variation occurs in the counting rate of radiation. FIG. 10B illustrates an energy histogram when a variation occurs in the counting rate of radiation.

In FIGS. 10A and 10B, a horizontal axis represents energy value, and a vertical axis represents frequency. The frequency refers to the number of detections of radiation having a corresponding energy value.

As illustrated in FIG. 10A, when no variation occurs in the counting rate of radiation, the radiation energy histogram becomes like an energy histogram A. In the energy histogram A, the frequency is confirmed in a wide range of energy values. In this case, the histogram generator 12 multiplies the energy value of the energy histogram A by one to generate an energy histogram B (first energy histogram).

As illustrated in FIG. 10B, when a variation occurs in the counting rate of radiation, the radiation energy histogram becomes like an energy histogram C. In the energy histogram C, the frequency is confirmed in a narrow range of energy values. In this case, the histogram generator 12 corrects the energy histogram C so that the frequency is confirmed in a wide range of energy values as in the energy histogram B. Specifically, for example, an AD value (energy value) constituting the energy histogram C is multiplied by a correction coefficient $ADBIN_B/ADBIN_C$ calculated based on $ADBIN_B$ and $ADBIN_C$. $ADBIN_B$ is an AD value corresponding to an energy gravity center of the energy histogram B and $ADBIN_C$ is an AD value corresponding to an energy gravity center of the energy histogram C. Thus, the histogram generator 12 generates an energy histogram D (second energy histogram) from the energy histogram C.

Figure 11:
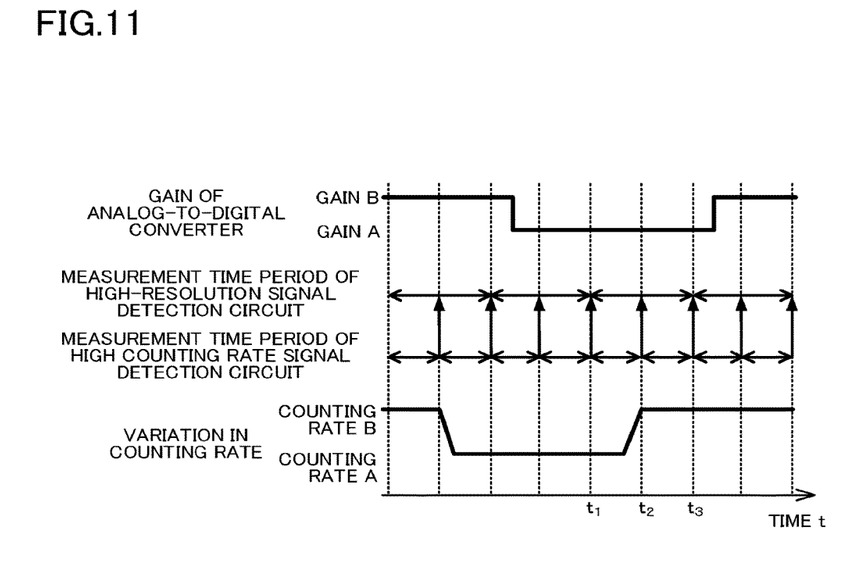
FIG. 11 is a view illustrating a relationship among timings at which the high counting rate signal detection circuit and high-resolution signal detection circuit perform measurement and time periods during which they perform the measurement.

FIG. 11 illustrates timings at which the high counting rate signal detection circuit 5 and high-resolution signal detection circuit 4 perform measurement and time periods during which they perform the measurement.

A horizontal axis of FIG. 11 represents time, and gain of the analog-to-digital converter 10, a measurement time period of the high-resolution signal detection circuit 4, a measurement time period of the high counting rate signal detection circuit 5, a variation in the counting rate of the radiation detector 2 appear from the top of FIG. 12.

The controller 14 controls the histogram generator 12. The histogram generator 12 generates the first energy histogram or second energy histogram based on the first count measured in a first time period from a first time point $t_1$ to a second time point $t_2$.

When the first count is not varied due to absence of a variation in the counting rate in the first time period, the controller 14 controls the histogram generator 12 to generate the first energy histogram.

When the first count is varied due to presence of a variation in the counting rate from the count rate A to the count rate B in the first time period, the controller 14 controls the histogram generator 12 to generate the second energy histogram.

The same operation as the above is performed in a second time period from the second time point $t_2$ to a third time point $t_3$.

The buffer 13 stores the energy histograms generated in the first and second time periods. The energy histograms generated in the first and second time periods are added to each other by the buffer 13. Thus, an energy histogram having a high energy resolution can be obtained in the high-resolution signal detection circuit 4.

A phase when the high counting rate signal detection circuit 5 performs a measurement is assumed to be $\theta_1$ and a period when the high counting rate signal detection circuit 5 performs a measurement is assumed to be $T_1$. A phase when the high-resolution signal detection circuit 4 performs a measurement is assumed to be $\theta_2$ and a period when the high-resolution signal detection circuit 4 performs a measurement is assumed to be $T_2$. A relationship between the period $T_1$ when the high counting rate signal detection circuit 5 performs a measurement and the period $T_2$ when the high-resolution signal detection circuit 4 performs a measurement is represented by the following expression (7):

[Formula 7]

$$T_1 \leq T_2 \quad (7)$$

A relationship between the phase $\theta_1$ when the high counting rate signal detection circuit 5 performs a measurement and the phase $\theta_2$ when the high-resolution signal detection circuit 4 performs a measurement is represented by the following expression (8):

[Formula 8]

$$\theta_1 \leq \theta_2 \quad (8)$$

As described above, in the present embodiment, even if the counting rate of the radiation detector 2 is varied, the energy histogram is corrected according to a variation of the counting rate. As a result, the radiation detection apparatus is prevented from being degraded in energy resolution. This allows an accurate radiation detection.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A radiation detection apparatus comprising:
   a radiation detector that outputs a pulse signal according to incident radiation;
   a first measurer that measures energy of the radiation on the basis of the pulse signal;
   a second measurer provided in parallel with the first measurer, and the second measurer measures a first count indicating a number of pulses of the pulse signal in a first time period from a first time point to a second time point and measures a second count indicating the number of pulses of the pulse signal in a second time period from the second time point to a third time point:
   a distributor that outputs the pulse signal from the radiation detector to the first measurer and the second measurer; and
   a controller that controls a drive voltage applied to the radiation detector so that a gain of the radiation detector at the first time is equal to the gain of the radiation detector at the second time,
   wherein the second measurer comprising:
   an amplifier for amplifying an amplitude of the pulse signal in accordance with the number of pulses of the pulse signal,
   a comparator for outputting a number of times when a value of the pulse signal output from the amplifier exceeds a threshold as the number of pulses of the pulse signal.

2. The radiation detection apparatus according to claim 1, wherein
   the amplifier the amplifier amplifiers the amplitude of the pulse signal so that the amplitude of the pulse signal becomes substantially constant.

3. The radiation detection apparatus according to claim 1, wherein the threshold is set according to the number of pulses of the pulse signal output from the comparator.

4. The radiation detection apparatus according to 3, wherein
the threshold is set to decrease as the number of pulses of the pulse signal output from the comparator increases.

5. The radiation detection apparatus according to claim 1, comprising:
a histogram generator that generates an energy histogram indicating a relationship between an energy value of the radiation and a frequency indicated by the pulse signal by multiplying an output from the first measurer by a correction coefficient obtained from measurement results of the second measurer in the first and second time periods.

6. The radiation detection apparatus according to claim 5, wherein
the histogram generator corrects the energy histogram by multiplying the radiation energy value by the correction coefficient so as to widen a range of the radiation energy value.

7. The radiation detection apparatus according to claim 1, comprising:
a memory that stores measurement results from the respective first and second measurers.

8. The radiation detection apparatus according to claim 7, comprising:
an image generator that forms an image on the basis of information stored in the memory.

9. The radiation detection apparatus according to claim 8, comprising:
a display that displays an image focused by the image generator.

* * * * *